US012774697B2

(12) United States Patent
Evans et al.

(10) Patent No.: US 12,774,697 B2
(45) Date of Patent: Oct. 27, 2026

(54) SYSTEMS AND METHODS FOR PRIORITIZED WAKE STEERING OF WIND TURBINES IN A WIND FARM

(71) Applicant: GE Infrastructure Technology LLC, Greenville, SC (US)

(72) Inventors: Scott Charles Evans, Burnt Hills, NY (US); Samuel Bryan Shartzer, Greenville, SC (US); Tapan Ravin Shah, Los Altos, CA (US); Upasana R, Bengaluru (IN); Nihaar Rajesh Shah, Jersey City, NJ (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 375 days.

(21) Appl. No.: 18/539,546

(22) Filed: Dec. 14, 2023

(65) Prior Publication Data

US 2025/0198380 A1 Jun. 19, 2025

(51) Int. Cl.
*F03D 7/04* (2006.01)
*F03D 17/00* (2016.01)

(52) U.S. Cl.
CPC ........... *F03D 7/049* (2023.08); *F03D 17/008* (2023.08); *F03D 17/029* (2023.08); (Continued)

(58) Field of Classification Search
CPC ...... F03D 7/049; F03D 17/008; F03D 17/029; F03D 7/0204; F03D 7/045; F03D 7/047; (Continued)

(56) References Cited

U.S. PATENT DOCUMENTS 6,320,272 B1 11/2001 Lading et al.
6,924,565 B2 8/2005 Wilkins et al.
(Continued)

FOREIGN PATENT DOCUMENTS

CA 3053618 A1 9/2018
CN 108448610 A 8/2018
(Continued)

OTHER PUBLICATIONS

EP Search Report, Apr. 28, 2025.
(Continued)

*Primary Examiner* — Charles Cai
(74) *Attorney, Agent, or Firm* — Dority & Manning, P.A.

(57) ABSTRACT

A system and method operate a wind farm having a plurality of wind turbines, and include determining a wind direction of a wind affecting the wind farm. Based on the wind direction, at least one upwind turbine is identified that produces a wake effect on one or more downwind wind turbines, the upwind wind turbine and affected downwind wind turbines defining a cluster. Based on a current yaw position of the upwind turbine and the wind direction, a yaw steer is determined for the upwind turbine to reduce the wake effect on the downstream wind turbines in the cluster. The yaw steer is based on increasing a net energy gain from the cluster, the net energy gain determined by subtracting an energy cost of the yaw steer from an increased energy production of the cluster resulting from the yaw steer. The upwind wind turbine is controlled to change yaw position in accordance with the yaw steer when the net energy gain satisfies a minimum threshold level.

18 Claims, 8 Drawing Sheets

(52) U.S. Cl.
CPC ..... *F05B 2260/84* (2013.01); *F05B 2270/204* (2020.08); *F05B 2270/321* (2013.01); *F05B 2270/329* (2013.01)

(58) Field of Classification Search
CPC ................ F03D 17/007; F05B 2260/84; F05B 2270/204; F05B 2270/321; F05B 2270/329; F05B 2270/20; Y02E 10/72
See application file for complete search history.

(56) References Cited

U.S. PATENT DOCUMENTS

| | | | |
|---|---|---|---|
| 7,004,724 | B2 | 2/2006 | Pierce et al. |
| 7,118,339 | B2 | 10/2006 | Moroz et al. |
| 7,299,627 | B2 | 11/2007 | Corten et al. |
| 7,357,622 | B2 | 4/2008 | Corten et al. |
| 7,603,202 | B2 | 10/2009 | Weitkamp |
| 7,804,184 | B2 | 9/2010 | Yuan et al. |
| 7,839,024 | B2 | 11/2010 | Cardinal et al. |
| 7,883,317 | B2 | 2/2011 | Ormel et al. |
| 7,941,304 | B2 | 5/2011 | Gundling |
| 7,987,067 | B2 | 7/2011 | Harrison et al. |
| 8,025,476 | B2 | 9/2011 | Zheng et al. |
| 8,035,241 | B2 | 10/2011 | Subramanian et al. |
| 8,050,899 | B2 | 11/2011 | Gignuere et al. |
| 8,057,174 | B2 | 11/2011 | Scholte-Wassink |
| 8,155,920 | B2 | 4/2012 | Egedal |
| 8,239,071 | B2 | 8/2012 | Lausen |
| 8,249,852 | B2 | 8/2012 | Thulke |
| 8,269,361 | B2 | 9/2012 | Egedal |
| 8,295,987 | B2 | 10/2012 | Gadre et al. |
| 8,398,369 | B2 | 3/2013 | Rebsdprf et al. |
| 8,495,911 | B2 | 7/2013 | Andersen et al. |
| 8,587,140 | B2 | 11/2013 | Egedal et al. |
| 8,712,593 | B2 | 4/2014 | Bjertrup et al. |
| 8,774,949 | B2 | 7/2014 | Ou |
| 8,821,108 | B2 | 9/2014 | Nayebi et al. |
| 8,853,877 | B1 | 10/2014 | Zalar et al. |
| 9,086,337 | B2 | 7/2015 | Merida et al. |
| 9,201,410 | B2 | 12/2015 | Ambekar et al. |
| 9,217,416 | B2 | 12/2015 | Spruce et al. |
| 9,249,666 | B2 | 2/2016 | Wood et al. |
| 9,261,076 | B2 | 2/2016 | Adballah et al. |
| 9,450,415 | B2 | 9/2016 | Larsen et al. |
| 9,458,830 | B2 | 10/2016 | Barker et al. |
| 9,466,032 | B2 | 10/2016 | Dull et al. |
| 9,512,820 | B2 | 12/2016 | Obrecht |
| 9,551,322 | B2 | 1/2017 | Ambekar et al. |
| 9,605,558 | B2 | 3/2017 | Perley et al. |
| 9,606,518 | B2 | 3/2017 | Evans et al. |
| 9,617,975 | B2 | 4/2017 | Attia |
| 9,644,612 | B2 | 5/2017 | Evans et al. |
| 9,683,552 | B2 | 6/2017 | Tiwari et al. |
| 9,739,262 | B2 | 8/2017 | Wang et al. |
| 9,760,069 | B2 | 9/2017 | Betran Palomas |
| 9,777,706 | B2 | 10/2017 | Couchman et al. |
| 9,790,921 | B2 | 10/2017 | Egedal et al. |
| 9,822,764 | B2 | 11/2017 | Esbensen et al. |
| 9,831,810 | B2 | 11/2017 | Achilles et al. |
| 9,835,138 | B2 | 12/2017 | Westergaard |
| 9,991,771 | B2 | 6/2018 | Zhu et al. |
| 10,041,475 | B1 | 8/2018 | Badrinath et al. |
| 10,100,813 | B2 | 10/2018 | Ravindra et al. |
| 10,132,295 | B2 | 11/2018 | Lund et al. |
| 10,241,170 | B2 | 3/2019 | Piron et al. |
| 10,247,170 | B2 | 4/2019 | Evans et al. |
| 10,247,171 | B2 | 4/2019 | Petitjean et al. |
| 10,260,481 | B2 | 4/2019 | Wilson et al. |
| 10,288,037 | B2 | 5/2019 | Cosack et al. |
| 10,360,500 | B2 | 7/2019 | Kabul et al. |
| 10,364,796 | B2 | 7/2019 | Brath et al. |
| 10,371,124 | B2 | 8/2019 | Wilson et al. |
| 10,387,728 | B2 | 8/2019 | Arya et al. |
| 10,393,093 | B2 | 8/2019 | Gregg et al. |
| 10,415,545 | B2 | 9/2019 | Kjaer et al. |
| 10,465,655 | B2 | 11/2019 | Brake et al. |
| 10,487,804 | B2 | 11/2019 | Evans et al. |
| 10,605,228 | B2 | 3/2020 | Evans et al. |
| 10,666,076 | B1 | 5/2020 | Kohn et al. |
| 10,711,767 | B2 | 7/2020 | Lutjen et al. |
| 10,724,499 | B2 | 7/2020 | Nayebi et al. |
| 10,731,630 | B2 | 8/2020 | Tiwari et al. |
| 10,794,366 | B2 | 10/2020 | Nielsen et al. |
| 10,815,967 | B2 | 10/2020 | Geisler et al. |
| 10,815,972 | B2 | 10/2020 | Evans et al. |
| 10,883,474 | B2 | 1/2021 | Geisler et al. |
| 10,883,475 | B2 | 1/2021 | Knudsen et al. |
| 10,954,919 | B1 | 3/2021 | Evans et al. |
| 10,989,173 | B2 | 4/2021 | Beltoft et al. |
| 11,060,504 | B1 | 7/2021 | Virani et al. |
| 11,231,012 | B1 | 1/2022 | Shartzer et al. |
| 11,313,351 | B2 | 4/2022 | Post et al. |
| 11,639,710 | B2 | 5/2023 | Post et al. |
| 11,649,804 | B2 | 5/2023 | Shartzer et al. |
| 11,674,498 | B1 | 6/2023 | Evans et al. |
| 2005/0253396 | A1 | 11/2005 | Mikhail et al. |
| 2006/0255594 | A1 | 11/2006 | Larsen |
| 2008/0086281 | A1 | 4/2008 | Santos |
| 2009/0192868 | A1 | 7/2009 | Rajiv et al. |
| 2009/0263245 | A1 | 10/2009 | Shi |
| 2010/0014969 | A1 | 1/2010 | Wilson et al. |
| 2010/0092292 | A1 | 4/2010 | Nies et al. |
| 2010/0133827 | A1 | 6/2010 | Huang et al. |
| 2010/0135789 | A1 | 6/2010 | Zheng et al. |
| 2010/0140940 | A1 | 6/2010 | Kammer |
| 2010/0152905 | A1 | 6/2010 | Kusiak |
| 2010/0274400 | A1 | 10/2010 | Ormel et al. |
| 2010/0274401 | A1 | 10/2010 | Kjaer et al. |
| 2011/0020122 | A1 | 1/2011 | Parthasarathy et al. |
| 2011/0049883 | A1 | 3/2011 | Hatch et al. |
| 2011/0106680 | A1 | 5/2011 | Vittal et al. |
| 2011/0145277 | A1 | 6/2011 | Gadre et al. |
| 2011/0175353 | A1 | 7/2011 | Egedal et al. |
| 2012/0053983 | A1 | 3/2012 | Vittal et al. |
| 2012/0083933 | A1 | 4/2012 | Subbu et al. |
| 2012/0226474 | A1 | 9/2012 | Trejo Sanchez et al. |
| 2013/0073223 | A1 | 3/2013 | Lapira et al. |
| 2013/0103202 | A1 | 4/2013 | Bowyer et al. |
| 2013/0106107 | A1 | 5/2013 | Spruce et al. |
| 2013/0166082 | A1 | 6/2013 | Ambekar et al. |
| 2013/0184838 | A1 | 7/2013 | Tchoryk, Jr. et al. |
| 2013/0255363 | A1 | 10/2013 | Merida et al. |
| 2013/0287568 | A1 | 10/2013 | Miranda |
| 2014/0003936 | A1 | 1/2014 | Agarwal |
| 2014/0100703 | A1 | 4/2014 | Dull et al. |
| 2014/0172329 | A1 | 6/2014 | Zhang et al. |
| 2014/0241878 | A1 | 8/2014 | Herrig |
| 2014/0328678 | A1 | 11/2014 | Guadayol Roig |
| 2014/0356161 | A1 | 12/2014 | Creaby |
| 2015/0050145 | A1 | 2/2015 | Cosack et al. |
| 2015/0086357 | A1 | 3/2015 | Gregg |
| 2015/0101401 | A1 | 4/2015 | Ekanayake et al. |
| 2015/0152847 | A1 | 6/2015 | Guadayol Roig |
| 2015/0211486 | A1 | 7/2015 | de Boer |
| 2015/0214821 | A1 | 7/2015 | Zhu et al. |
| 2015/0233348 | A1 | 8/2015 | Hiremath et al. |
| 2015/0308416 | A1 | 10/2015 | Ambekar et al. |
| 2015/0345476 | A1 | 12/2015 | Gregg et al. |
| 2016/0032893 | A1 | 2/2016 | Herrig et al. |
| 2016/0084224 | A1 | 3/2016 | Tyber et al. |
| 2016/0084233 | A1 | 3/2016 | Evans et al. |
| 2016/0169204 | A1 | 6/2016 | Wang et al. |
| 2016/0222946 | A1 | 8/2016 | Krings |
| 2016/0298607 | A1 | 10/2016 | Gregg et al. |
| 2016/0333854 | A1 | 11/2016 | Lund et al. |
| 2017/0022974 | A1 | 1/2017 | Roma |
| 2017/0122289 | A1 | 5/2017 | Kristoffersen et al. |
| 2017/0268487 | A1 | 9/2017 | Yang et al. |
| 2017/0284368 | A1 * | 10/2017 | Franke ................. F03D 7/0292 |
| 2017/0306926 | A1 | 10/2017 | Deshpande et al. |
| 2017/0328346 | A1 | 11/2017 | Hales et al. |
| 2017/0328348 | A1 | 11/2017 | Wilson et al. |
| 2017/0335827 | A1 | 11/2017 | Wilson et al. |
| 2017/0350369 | A1 | 12/2017 | Evans et al. |

(56) References Cited

U.S. PATENT DOCUMENTS

| | | | |
|---|---|---|---|
| 2017/0370348 | A1 | 12/2017 | Wilson et al. |
| 2018/0003153 | A1 | 1/2018 | Damgaard |
| 2018/0010576 | A1* | 1/2018 | Brake .................... F03D 7/048 |
| 2018/0030955 | A1 | 2/2018 | Vaddi et al. |
| 2018/0223807 | A1 | 8/2018 | Badrinath Krishna et al. |
| 2018/0307986 | A1 | 10/2018 | Kabul et al. |
| 2018/0364694 | A1 | 12/2018 | Watanabe et al. |
| 2019/0170119 | A1 | 6/2019 | Nielsen |
| 2019/0203693 | A1 | 7/2019 | Tiwari et al. |
| 2019/0226454 | A1 | 7/2019 | Bjorn et al. |
| 2019/0278242 | A1 | 9/2019 | Gervais |
| 2019/0287026 | A1 | 9/2019 | Calmon et al. |
| 2019/0305703 | A1 | 10/2019 | Holliday et al. |
| 2019/0317741 | A1 | 10/2019 | Herr et al. |
| 2019/0317880 | A1 | 10/2019 | Herr et al. |
| 2019/0324430 | A1 | 10/2019 | Herzog et al. |
| 2019/0360469 | A1 | 11/2019 | de Boer |
| 2020/0056589 | A1 | 2/2020 | Evans et al. |
| 2020/0064788 | A1 | 2/2020 | Hentschel et al. |
| 2020/0082043 | A1 | 3/2020 | Chu et al. |
| 2020/0192306 | A1 | 6/2020 | Virani et al. |
| 2020/0271093 | A1 | 8/2020 | Grunnet et al. |
| 2020/0285738 | A1 | 9/2020 | Tippenhauer et al. |
| 2020/0291921 | A1 | 9/2020 | Ou |
| 2020/0291922 | A1 | 9/2020 | Hovgaard et al. |
| 2020/0300227 | A1 | 9/2020 | Evans et al. |
| 2020/0340450 | A1 | 10/2020 | Grunnet et al. |
| 2021/0047999 | A1 | 2/2021 | Gebraad |
| 2021/0054826 | A1 | 2/2021 | Grunnet et al. |
| 2021/0115900 | A1 | 4/2021 | Gebraad |
| 2021/0207580 | A1 | 7/2021 | Egedal et al. |
| 2021/0246875 | A1 | 8/2021 | Fu et al. |
| 2021/0262441 | A1 | 8/2021 | Jacobsen |
| 2021/0310461 | A1 | 10/2021 | King et al. |
| 2021/0363969 | A1 | 11/2021 | Egedal et al. |
| 2022/0282706 | A1 | 9/2022 | Esbensen et al. |
| 2022/0412307 | A1 | 12/2022 | Leonardi et al. |
| 2022/0412310 | A1 | 12/2022 | Van Wingerden et al. |
| 2023/0034766 | A1 | 2/2023 | Evans et al. |
| 2023/0086699 | A1 | 3/2023 | Machefaux et al. |
| 2023/0175481 | A1 | 6/2023 | Mirzaei et al. |

FOREIGN PATENT DOCUMENTS

| | | | |
|---|---|---|---|
| CN | 109492777 | A | 3/2019 |
| DE | 102016117191 | A1 | 3/2018 |
| EP | 1269282 | A1 | 1/2003 |
| EP | 2048562 | B1 | 8/2009 |
| EP | 2213873 | A1 | 8/2010 |
| EP | 2477086 | A1 | 7/2012 |
| EP | 2518308 | A1 | 10/2012 |
| EP | 2063110 | B1 | 8/2015 |
| EP | 3 037 657 | A1 | 6/2016 |
| EP | 3121442 | A1 | 1/2017 |
| EP | 3406897 | A1 | 11/2018 |
| EP | 3517774 | A1 | 7/2019 |
| EP | 3527817 | A1 | 8/2019 |
| EP | 2767710 | B1 | 12/2019 |
| EP | 3597907 | A1 | 1/2020 |
| EP | 3501080 | B1 | 4/2020 |
| EP | 3642480 | A1 | 4/2020 |
| EP | 3724490 | A1 | 10/2020 |
| EP | 3783221 | A1 | 2/2021 |
| IN | 2014CH02155 | A | 1/2016 |
| IN | 2015CH06300 | A | 7/2016 |
| IN | 201744022517 | A | 12/2017 |
| IN | 201641033620 | A | 4/2018 |
| WO | WO 01/73518 | A1 | 10/2001 |
| WO | WO2004/111446 | A1 | 12/2004 |
| WO | WO2012/019331 | A1 | 2/2012 |
| WO | WO 2012/109616 | A2 | 8/2012 |
| WO | WO2013/152776 | A1 | 10/2013 |
| WO | WO2017/139046 | A1 | 8/2017 |
| WO | WO2017/174090 | A1 | 10/2017 |
| WO | WO2017/211367 | A1 | 12/2017 |
| WO | WO2018/121668 | A1 | 7/2018 |
| WO | WO2018/198225 | A1 | 11/2018 |
| WO | WO2019/158762 | A1 | 8/2019 |
| WO | WO2020/028578 | A1 | 2/2020 |
| WO | WO2021/096363 | A1 | 5/2021 |
| WO | WO2021/121510 | A1 | 6/2021 |
| WO | WO2021/156287 | A1 | 8/2021 |
| WO | WO2021/209112 | A1 | 10/2021 |

OTHER PUBLICATIONS

Ervin Bossanyi: "Optimising yaw control at wind farm level", Journal of Physics: Conference Series, Institute of Physics Publishing, Bristol, GB, vol. 1222, No. 1, May 21, 2019.

Ahmad et al., Analysis of Two Onshore Wind Farms with a Dynamic Farm Controller, J. Park H.H. Law, Applied Energy, vol. 165, Nov. 2015, pp. 151-165.

Barthelmie et al., Meteorological Controls on Wind Turbine Wakes, XP011497220, Proceedings of the IEEE, vol. 101, No. 4, New York, Apr. 2013, pp. 1010-1019.

Beyer et al., Wake Effects in a Linear Wind Farm, XP008022903, Journal of Wind Engineering and Industrial Aerodynam, vol. 51, No. 3, May 1994, pp. 303-318.

Evans et al., Towards Wind Farm Performance Optimization through Empirical Models, 2014 IEEE Aerospace Conference, Big Sky, MT, Mar. 2014, pp. 1-12.

Evans et al., Wind Farm Performance Validation Through Machine Learning: Sector-wise Honest Brokers, 2015 IEEE Aerospace Conference, Big Sky, MT, 2015, pp. 1-8.

Leahy et al., Diagnosing Wind Turbine Faults Using Machine Learning Techniques Applied to Operational Data, 2016 IEEE International Conference on Prognostics and Health Management (ICPHM), Conference Ottawa, ON, Canada, Jun. 20, 2016-Jun. 22, 2016, pp. 1-8.

Marvuglia et al., Monitoring of Wind Farms' Power Curves Using Machine Learning Techniques, Applied Energy, vol. 98, Oct. 2012, pp. 574-583.

Morshedizadeh et al., Power Production Prediction of Wind Turbines Using a Fusion of MLP and ANFIS Networks, IET Renewable Power Generation, vol. 12, Issue 09, Jul. 9, 2018, pp. 1025-1033.

Ouyang et al., Monitoring Wind Turbines' Unhealthy Status: A Data-Driven Approach, IEEE Transactions on Emerging Topics in Computational Intelligence, Miami, FL, 2018, pp. 1-10.

Park et al., A Data-Driven, Cooperative Wind Farm Control to Maximize the Total Power Production, XP029400213, Applied Energy, Elsevier Science, vol. 165, No. 31, Dec. 2015, pp. 151-165.

Rasmussen et al., Gaussian Processes for Machine Learning, Jun. 29, 2010. Abstract Only.

Ritter et al., Neighborhood Effects in Wind Farm Performance: A Regression Approach, Energies, vol. 10, Mar. 16, 2017, 16 pages.

Toubakh et al., Advanced Pattern Recognition Approach for Fault Diagnosis of Wind Turbines, 2013 12th International Conference on Machine Learning and Applications, 2013, pp. 368-373.

Vaccaro et al., An Adaptive Framework Based on Multi-Model Data Fusion for One-day-Wind Power Forecasting, Electric Power Systems Research, vol. 81, Issue 03, Mar. 2011, pp. 775-782.

* cited by examiner

Wind @180 degrees: Cluster #4

First priority steer (from steer 10 to -40) — Second priority steer (from steer 10 to 20)

| Gain (kW) | 15 | 9 | 5 | 2 | **4** | 7 | 14 |
|---|---|---|---|---|---|---|---|
| **Steer** | -40 | -20 | -10 | 0 | **10** | 15 | 20 |

Cost of first priority steer = Cost (motor start) + 50° * Cost (motor run/degree)

Cost of second priority steer = Cost (motor start) + 10° * Cost (motor run/degree)

Gain (net) = Gain(final) - Gain(initial) - Cost(steer)

*Fig. 4B*

| Cluster w/ prioritized steer | Downstream turbines | Gain |
|---|---|---|
| 6 | 16, 17 | 50kW |
| 7 | 17, 18 | 40kW |
| 9 | 19 | 30kW |
| 4 | 14, 15 | 28kW |
| 5 | 14, 15, 16 | 25kW |

*Fig. 4C*

| | Cluster w/ prioritized steer | Downstream turbines | Gain |
|---|---|---|---|
| | 6 | 16, 17 | 50kW |
| remove ⟹ | 7 | 17, 18 | 40kW |
| | 9 | 19 | 30kW |
| | 4 | 14, 15 | 28kW |
| remove ⟹ | 5 | 14, 15, 16 | 25kW |

*Fig. 4D*

| Cluster w/ prioritized steer | Downstream turbines | Gain |
|---|---|---|
| 3 | 4, 14 | 30kW |
| 2 | 13, 14 | 20kW |
| 5 | 6 | 10kW |
| 8 | 9,19 | 05kW |
| 1 | 12,13 | 02kW |

*Fig. 5B*

| | Cluster w/ prioritized steer | Downstream turbines | Gain |
|---|---|---|---|
| | 3 | 4, 14 | 30kW |
| remove ⇒ | 2 | 13, 14 | 20kW |
| | 5 | 6 | 10kW |
| | 8 | 9,19 | 05kW |
| remove ⇒ | 1 | 12,13 | 02kW |

*Fig. 5C*

SYSTEMS AND METHODS FOR PRIORITIZED WAKE STEERING OF WIND TURBINES IN A WIND FARM

FIELD

The present disclosure relates in general to windfarms, and more particularly to systems and methods for operating the wind farm so as to mitigate reductions in power output to do wake effects.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

Often, a number of wind turbines are used in conjunction with one another and are arranged as a wind farm. In such an arrangement, the wind impacting a downwind turbine may be detrimentally affected by an upwind obstruction, such as an upwind turbine. When one or more downwind turbines is affected by the wake from an upwind turbine, the total AEP (annual energy production) of the wind farm is reduced.

The grouping of one or more upwind turbines with one or more wake-affected downwind turbines may be thought of as a "turbine cluster." With certain conventional wind farm control schemes, the controllers for the downwind turbines may seek to alter a setpoint for the downwind turbine to offset the wake affect, for example by initiating a yaw adjustment, pitch adjustment, TSR (tip speed ratio) control adjustment, and so forth, in order to optimize the power production of the downwind turbine generated in response to the wake-affected wind.

It has also been recognized in the industry that a yaw offset of the upwind turbine in the turbine cluster may have a more pronounced effect on mitigating downstream wake affects. Thus, control schemes seeking to optimize AEP of the wind farm via wake steering yaw offset of the upwind turbines are being developed.

However, these conventional optimization schemes of the upwind turbines and wake-affected downwind turbines without consideration to the energy costs associated with the wake steer may actually result in a suboptimal power output for the cluster overall (and the wind farm) for the given environmental conditions. In other words, the costs of the adjustments may be greater than the energy benefit.

In addition, excessive yaw adjustments to the wind turbines results in wear and reduction of the life of the yaw drive system and associated parts, thereby adding additional costs to the energy production of the wind turbine.

In view of the aforementioned, the art is continuously seeking new and improved systems and methods for operating a wind farm so as to mitigate reductions in power output due to wake effects.

BRIEF DESCRIPTION

Aspects and advantages of the invention will be set forth in part in the following description, or may be obvious from the description, or may be learned through practice of the invention.

An embodiment of the invention is directed to a method for operating a wind farm having a plurality of wind turbines. The method includes use of a controller or control system to carry out various process steps, including determining a wind direction of a wind affecting the wind farm. Based on the wind direction, the method identifies at least one upwind turbine that produces a wake effect on one or more downwind wind turbines. The upwind wind turbine and affected downwind wind turbines define a cluster. Based on a current yaw position of the upwind turbine and the wind direction, a yaw steer is determined for the upwind turbine to reduce the wake effect on the downstream wind turbines in the cluster. The yaw steer is based on maximizing a net energy gain from the cluster, wherein the net energy gain is determined by subtracting an energy cost of the yaw steer from an increased energy production of the cluster resulting from the yaw steer. The upwind wind turbine is then controlled to change yaw position in accordance with the yaw steer when the net energy gain satisfies a minimum threshold level.

The method may include determining and storing one or more of the following for access by the controller: the identification of the cluster at a plurality of different wind directions; the energy cost for different yaw steers; and the increased energy production of the cluster for different yaw steers at a plurality of different wind directions.

In a particular embodiment of the method, the minimum threshold level is based at least in part on considerations of machinery wear and lifespan reduction caused by the yaw steers. In other words, the wear and tear on the machine components resulting from the yaw steer is factored into the minimum threshold level.

Embodiments of the method may include identifying a plurality of the clusters, determining the yaw steer and net energy gain for each of the clusters, ranking the clusters according to the net energy gain of each of the clusters, and performing the yaw steers according to the ranking only for the clusters satisfying the minimum threshold level of the net energy gain.

The ranking of the clusters includes may include satisfying a certainty threshold for determination of the wake effect on the downwind wind turbines, wherein a cluster that does not satisfy the certainty threshold is not ranked and does not receive a yaw steer.

Certain embodiments of the method may further include maximizing the net energy gain by computing the net energy gain for a plurality of yaw steers for the cluster and selecting the yaw steer producing the highest net energy gain.

The ranking of the clusters may be conducted according to various techniques, including one or more of: (a) a relative geographic position analysis of the upwind and downwind wind turbines in the clusters; (b) a physics based simulation model of the clusters; (c) a data driven analysis based on known energy production from the clusters at different wind conditions; (d) AI models applied to simulation data; and (e) a certainty priority consideration given to a cluster having a free stream upwind turbine directly affecting downwind wind turbines.

Still other embodiments of the method may include, after ranking the clusters according to the net energy gain of the clusters, determining non-disjoint clusters that share wind turbines with adjacent clusters, and removing non-disjoint clusters from the ranking that have a lesser net energy gain than adjacent non-disjoint clusters. In this embodiment, only disjoint clusters may remain in the ranking after the removal of the non-disjoint clusters.

The identification of the plurality of clusters at a plurality of different wind directions may be predetermined and stored for access by the controller.

The present invention also encompasses a wind farm comprising a plurality of wind turbines. A controller or control system operates the wind farm in accordance with any one or combination of the methods discussed above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 4B-4D provide tables relative to the configuration of the wind farm of FIG. 4A;

FIGS. 5B-5C provide tables relative to the configuration of the wind farm of FIG. 5A.

Figure 1:
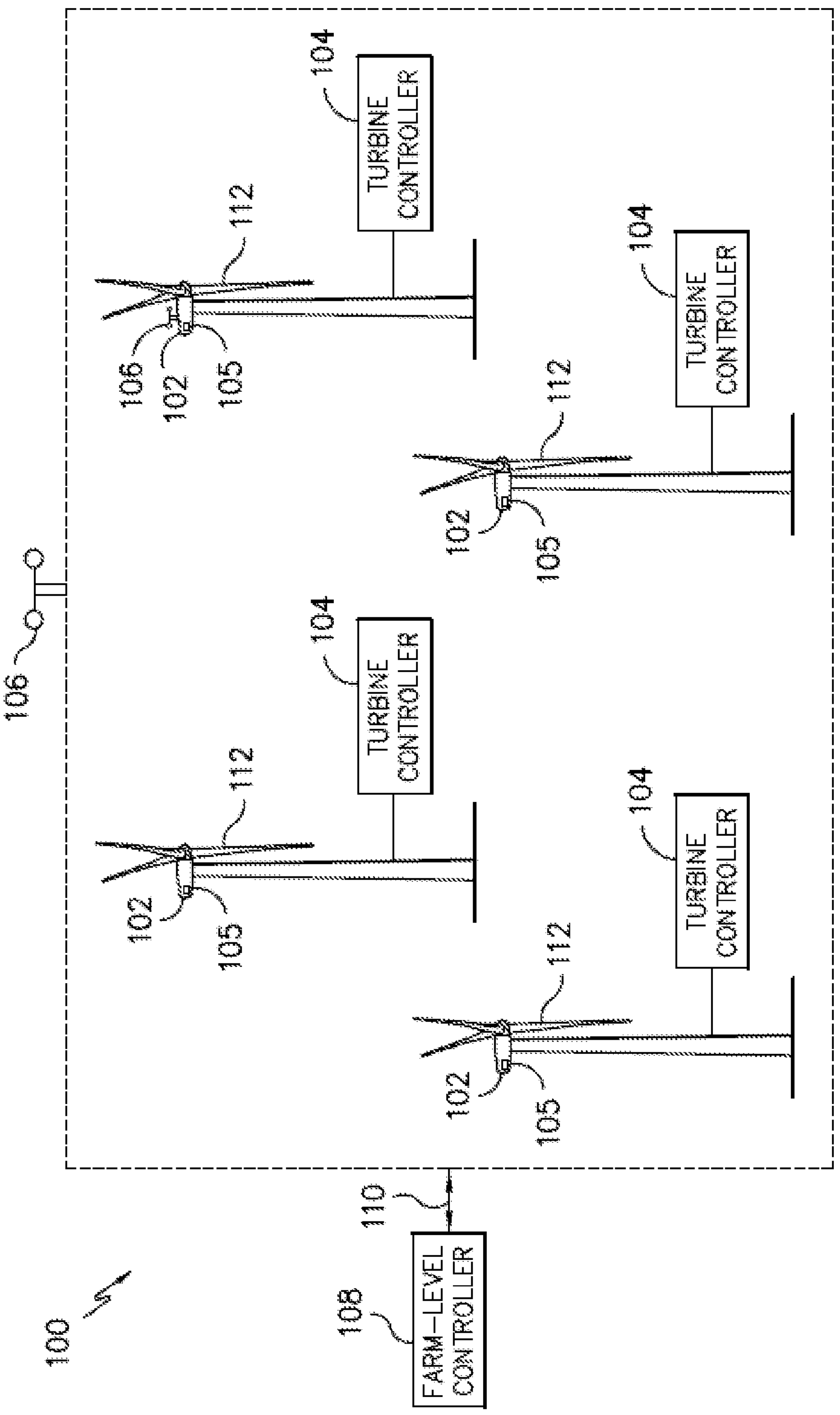
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind farm. In particular, the systems and methods may facilitate the optimization of the output of the wind farm when at least one wind turbine is affected by a wake emanating from another turbine. In other words, the systems and methods may be directed to the optimization of the power output of the wind farm when the wind impacting a downwind turbine differs from a freestream wind due to a wake generated by an upwind turbine when the wind has a given wind profile (e.g., wind speed and wind direction). As such, the present disclosure may include systems and methods which facilitate the optimization of an operational setpoint (e.g., yaw position) for the upwind turbine, as well as operational setpoints for the downwind wind turbines (such as pitch, tip speed ratio (TSR), generator torque, and/or yaw setpoints) in order to maximize the power output for the wind farm for the given wind profile when at least one wind turbine is subjected to wake effects.

Referring now to the drawings, FIG. 1 illustrates an exemplary embodiment of a wind farm 100 containing a plurality of wind turbines 102 that may be operated in accordance with aspects of the present disclosure. The wind turbines 102 may be arranged in any suitable fashion. Typically, wind turbine arrangement in a wind farm is determined based on numerous optimization algorithms such that AEP (annual energy production) is maximized for corresponding site wind climate. It should be understood that any wind turbine arrangement may be implemented, such as on uneven land, without departing from the scope of the present disclosure.

FIG. 1 also depicts one or more wind sensors 106 operationally configured to detect wind conditions acting on the wind turbines 102 within the wind farm 100. The wind sensor 106 may be located remote from the wind turbines 102 or configured on the wind turbines 106, as depicted in FIG. 1.

Figure 2:
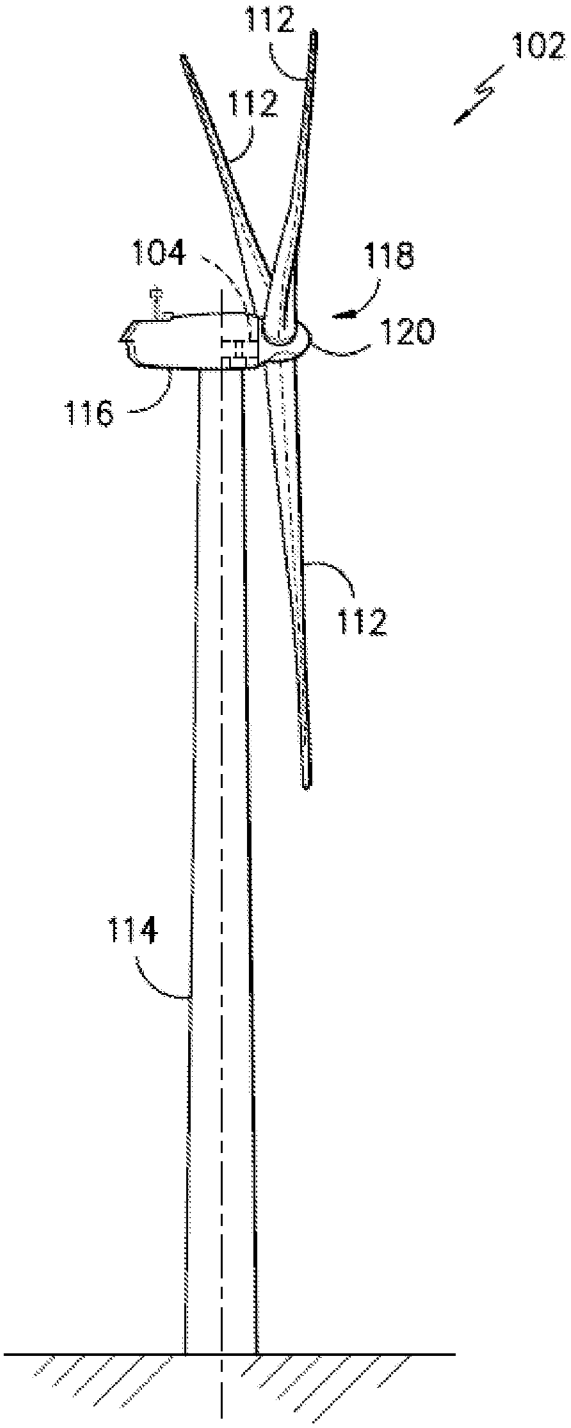
FIG. 2 illustrates a illustrates a schematic diagram of one embodiment of a controller or control system according to the present disclosure.

In addition, it should be understood that the wind turbines 102 of the wind farm 100 may have any suitable configuration, such as the embodiment shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118.

As shown generally in the figures, each wind turbine 102 of the wind farm 100 may also include a turbine controller 104 communicatively coupled to a farm controller 108. Moreover, in one embodiment, the farm controller 108 may be coupled to the turbine controllers 104 through a network 110 to facilitate communication between the various wind farm components. The wind turbines 102 may also include one or more sensors 105, 106 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; shaft sensors for measuring loads of the rotor shaft and/or the rotational speed of the rotor shaft; temperature sensors for monitoring the temperature of a component or space. Additionally, the wind turbine 102 may include one or more tower sensors for measuring the loads transmitted through the tower 114 and/or the acceleration of the tower 114 in a fore/aft or side/side direction. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, light detecting/ranging sensors, radiometers, pitot tubes, rawinsondes, other optical sensors, and/or any other suitable sensors.

Figure 3:
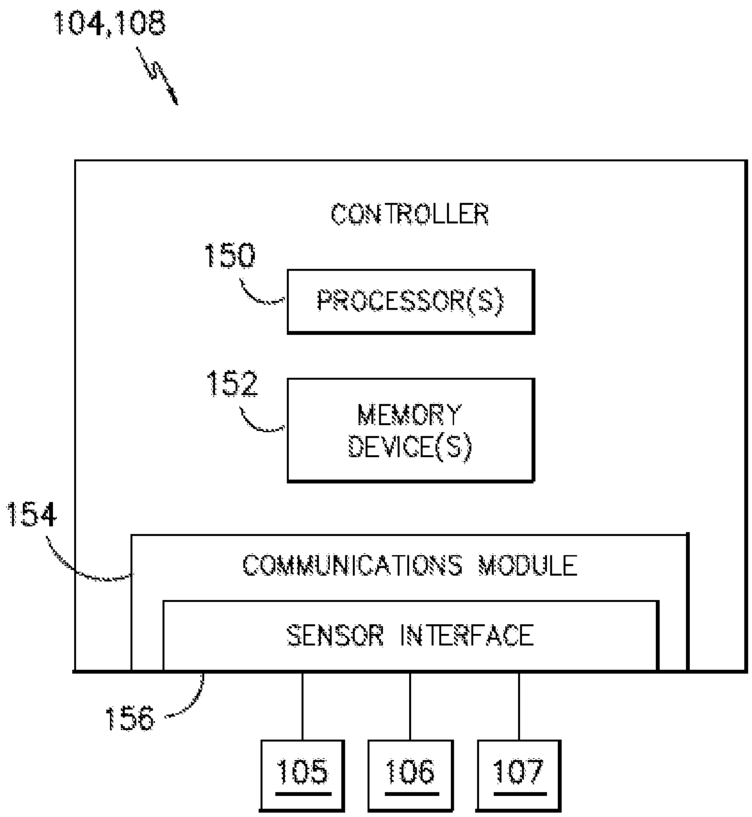
FIG. 3 illustrates a schematic diagram of one embodiment of a wind farm having a plurality of wind turbines according to the present disclosure.

Referring now to FIG. 3, a block diagram is provided of an embodiment of suitable components that may be included within the farm controller 108, the turbine controller(s) 104, and/or other suitable controller according to the present disclosure. As shown, the controller(s) 104, 108 may include one or more processor(s) 150 and associated memory device(s) 152 configured to perform a variety of computer-implemented functions (e.g., performing the methods, steps, calculations and the like and storing relevant data as disclosed herein). Additionally, the controller(s) 104, 108 may also include a communications module 154 to facilitate communications between the controller(s) 104, 108 and the various components of the wind turbine 102. Further, the communications module 154 may include a sensor interface 156 (e.g., one or more analog-to-digital converters) to permit signals transmitted from one or more sensors 105, 106 (such as the sensors described herein) to be converted into signals that can be understood and processed by the processors 150. It should be appreciated that the sensors 105, 106 may be communicatively coupled to the communications module 154 using any suitable means. For example, as shown, the sensors 105, 106 (and any other environmental sensors 107 configured with the wind turbines 102 or wind farm 100) are coupled to the sensor interface 156 via a wired connection. However, in other embodiments, the sensors 105, 106, 107 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller(s) 104, 108 to perform various functions as described herein.

Moreover, the network 110 that couples the farm controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

As mentioned, the wind farm 100 may include environmental sensors for monitoring a wind profile of the wind (W) affecting the wind farm 152, such as the wind sensors 106 and other sensors 107. These sensors 106, 107 may, for example, be a wind vane, an anemometer, a light detecting/ranging sensor, thermometer, barometer, or other suitable sensor. The data gathered by the environmental sensor(s) 106, 107 may include measures of wind speed, wind direction, wind shear, wind gust, wind veer, atmospheric pressure, pressure gradient and/or temperature. It should be appreciated that the environmental sensor(s) 106, 107 may include a network of sensors and may be positioned away from the turbine(s) 102. It should be appreciated that environmental conditions may vary significantly across a wind farm 100. Thus, the environmental sensor(s) 106, 107 may allow for the local environmental conditions at each wind turbine 100 to be monitored individually by the respective turbine controllers and collectively by the farm controller.

Figure 4A:
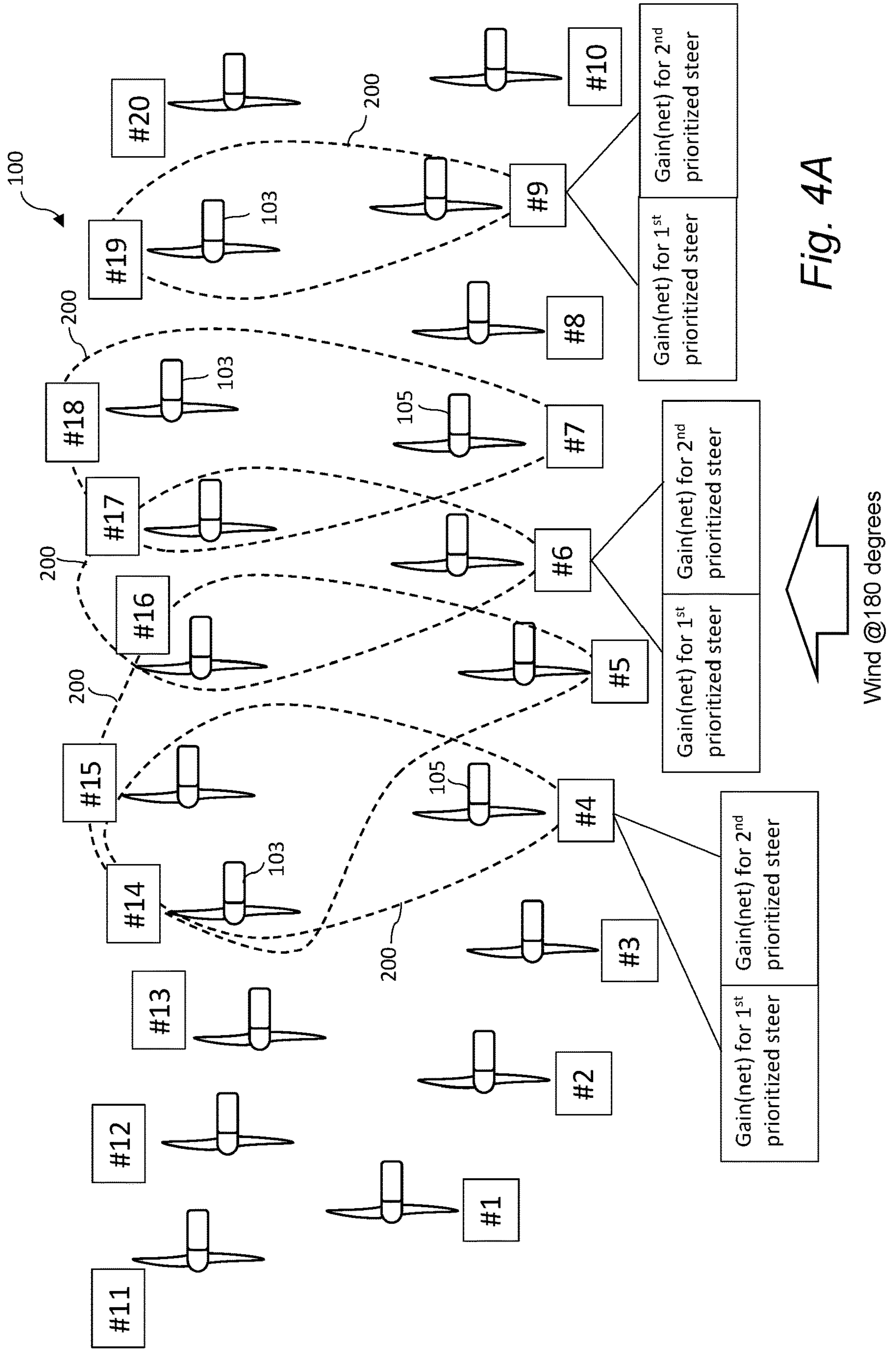
FIG. 4A illustrates diagram of a wind farm with the wind turbines assigned to particular clusters depending on the wind direction.

Referring now to FIGS. 4A through 4D, aspects of method and system embodiments incorporating aspects of the present disclosure are presented. The wind farm 100 includes twenty wind turbines 102 (labeled #1 through #20). The wind direction for wind acting on the wind turbines 102 has been determined by any one or combination of the sensors discussed above to be from the south at about 180-degrees. Based on this wind direction, one or more clusters 200 are identified by the controller(s), wherein each cluster 200 includes a "free" upwind wind turbine 105 that is impacted by wind unaffected by any other wind turbine. The upwind wind turbine 105 produces a wake that affects at least one downwind wind turbine 103. For example, in one cluster 200, wind turbine #4 is the upwind wind turbine 105 and wind turbines #14 and #15 are the wake-effected downwind turbines 103 impacted by the wake from wind turbine #4 in the respective cluster 200. Similarly, in another cluster 200, wind turbine #7 is the upwind turbine 105 and wind turbines #17 and #18 are the wake-effected downwind turbines 103. It should be appreciated that, as depicted in FIG. 4A, one or more of the wake-effected downwind turbines 103 may be impacted by the wake of multiple upwind wind turbines 105 and, thus, belong to multiple clusters. For example, wind turbine #17 is associated with the cluster 200 for upwind turbine #6 and for the cluster 200 for upwind turbine #7.

Focusing on a single cluster 200 including the upwind wind turbine #4 and wake-effected downwind wind turbines #14 and #15 ("cluster #4"), the upwind wind turbine #4 has a current yaw angle/position. The method proposes to determine a yaw steer for this upwind wind turbine #4 that increases (preferably, maximizes) a net energy (power) gain from cluster #4, wherein the net energy gain is computed by subtracting an energy cost of the yaw steer from an increased energy production of the cluster resulting from the yaw steer. For example, referring to FIG. 4B, for cluster #4 the wind turbine #4 is at a current yaw steer/position of +10 degrees and the cluster is producing an overall cluster power of 4 kW (i.e., the power gain from cluster #4). Changes in the power gain at various yaw steers of the upwind wind turbine #4 are determined based on modeling, actual data, predictions, or any other suitable method, and presented in the table. The largest gain of 15 kW for the cluster can be achieved by steering wind turbine #4 to a −40 degree yaw steer position, which is a 50 degree change in yaw position. The energy cost of this steer is represented as:

Cost of first priority steer=Cost(motor start)+50°*Cost(motor run/degree)

The overall net gain of cluster #4 for the first priority steer is represented as:

first priority steer Gain(net)=Gain(final)−Gain(initial)−Cost(steer)

Assuming that the cost of the 50 degree yaw steer is 2.0 kW, the net Gain of the first priority steer is:

first priority steer Gain(net)=15−4−2.0=9.0 kW

The overall gain of 9.0 kW for the cluster is then compared to a threshold gain value that represents a minimum gain required before the yaw steer will be implemented. For example, if the threshold gain value is set at 5.0 kW, the yaw steer of wind turbine #4 to the −40 degree yaw position will be initiated by the controller and transmitted to the wind turbine controller to steer wind turbine #4. However, if the threshold gain value is set at 9.5 kW, then wind turbine #4 will not be steered.

Still referring to FIG. 4B, the method may include determining the net Gain for multiple steers so as to maximize the gain from cluster #4. For example, although the −40 degree yaw steer produces the largest power gain (15 kW), it may not produce the overall maximized power gain depending on the cost of the steer. FIG. 4B depicts that a second priority steer from the current +10 degree yaw position to the +20 degree yaw position (a 10-degree steer) results in a power gain of 14.0 kW from the cluster. The energy cost of this steer is represented as:

Cost of second priority steer=Cost(motor start)+10°*Cost(motor run/degree)

Assuming that the cost of the 10 degree steer is 0.4 kW (one-fifth of the 50 degree steer), the net Gain of the second priority steer is:

second priority steer Gain(net)=14−4−0.3=9.7 kW

Thus, the second priority steer actually produces a greater net Gain from cluster #4 (9.7 kW as compared to 9.0 kW). In order to maximize the net Gain from cluster #4, the controller will select the +20 degree yaw steer. Again, this net Gain (9.7 kW) will be compared to threshold gain value prior to initiating the yaw steer.

Certain of the values or information used for the control method may be predetermined and stored for access and use by the controller. This stored data may include, for example: the identification of the cluster at a plurality of different wind directions; the energy cost for different yaw steers; and the increased energy production of the cluster for different yaw steers at a plurality of different wind directions.

In certain embodiments, the minimum threshold level against which the net gain of the cluster is compared may be based at least in part on a consideration of machinery wear and lifespan reduction caused by the yaw steers. For example, each yaw steer produces wear on the yaw motor and yaw gears, with multiple steers and greater magnitude steers producing more wear and reducing the lifespan of the components. A consideration or value attributed to this wear on the components may be built into the threshold value. For example, the threshold value for a 40-degree yaw steer may be set higher than the value for a 20-degree yaw steer. In another scenario, the threshold values may increase as the frequency of yaw steers increases.

Still referring to FIGS. 4A through 4D, the method may include identifying a plurality of the clusters 200 in the wind farm 100 for a given wind condition (e.g., including the southernly wind depicted in FIG. 4A). For example, FIG. 4C depicts that five clusters are identified (clusters 6, 7, 9, 4, 5) for the wind farm 100 in FIG. 4A for wind conditions that produce the net gains depicted in the chart (the gain values in FIG. 4C are for illustrative purposes only). For each of these clusters, the prioritized yaw steer for the upwind turbine and net energy gain is determined as discussed above with respect to cluster #4, wherein the net energy gains may be the maximized net gains computed after consideration of multiple steers for each cluster. The clusters may be ranked according to their net energy gains, wherein actual yaw steers for the upwind turbine within each cluster will be implemented according to the ranking for clusters that satisfy the minimum threshold values.

It should be appreciated that not all of the clusters identified in FIG. 4C need to receive a yaw steer for their respective upwind turbine. It may be desired to only steer the first one, two, or three clusters for various reasons, including to minimize steer frequency (and reduce machine component wear). For this, the minimum threshold value may increase for clusters within the ranking, wherein the threshold value is greater for lower-ranked clusters.

Various other considerations may be factored into the ranking of the clusters. For example, the ranking may include satisfying a certainty threshold for determination of the wake effect on the downwind wind turbines in the cluster, wherein a cluster that does not satisfy the certainty threshold is not ranked (or decreased in the rank) and may not receive a yaw steer even if the minimum threshold value is satisfied by the cluster.

The determination of the net gains and ranking of the clusters in general, including the certainty threshold discussed above, may be based on various data sources and processes, including one or more of: (a) a relative geographic position analysis of the upwind and downwind wind turbines in the clusters; (b) a physics based simulation model of the clusters; (c) a data driven analysis based on known energy production from the clusters at different wind conditions; (d) AI models applied to simulation data; and (e) a certainty priority consideration given to a cluster having a free stream upwind turbine directly affecting downwind wind turbines.

Referring to FIGS. 4A and 4D, embodiments of the present method and associated system may include additional refinement or considerations to the ranked clusters to include determining non-disjoint clusters that share wind turbines with adjacent clusters. For example, in FIG. 4A, cluster #9 is a disjoint cluster because it does not share wake-effected downwind turbines with any other cluster. Clusters #4, #5, #6, and #7 are non-disjoint clusters because they share at least one downwind turbine with another adjacent cluster.

Referring to FIG. 4D, the ranking of the clusters indicated in FIG. 4C is further modified to remove the non-disjoint clusters from the ranking that have a lesser net energy gain than adjacent non-disjoint clusters. For example, cluster #7 is removed from the ranking because it shares turbine #17 with cluster #6, which has a higher gain (50 kW) than cluster #7 (40 kW). Similarly, cluster #5 is removed from the ranking because it shares turbines #14 and #15 with cluster #6, which has a higher gain (28 kW) than cluster #7 (25 kW). After removal of clusters #5 and #7, only disjoint clusters #4, #6, and #9 remain in the ranking.

It should be appreciated that the identification of the plurality of clusters at a plurality of different wind directions is predetermined and stored in a memory for access by the controller.

Figure 5A:
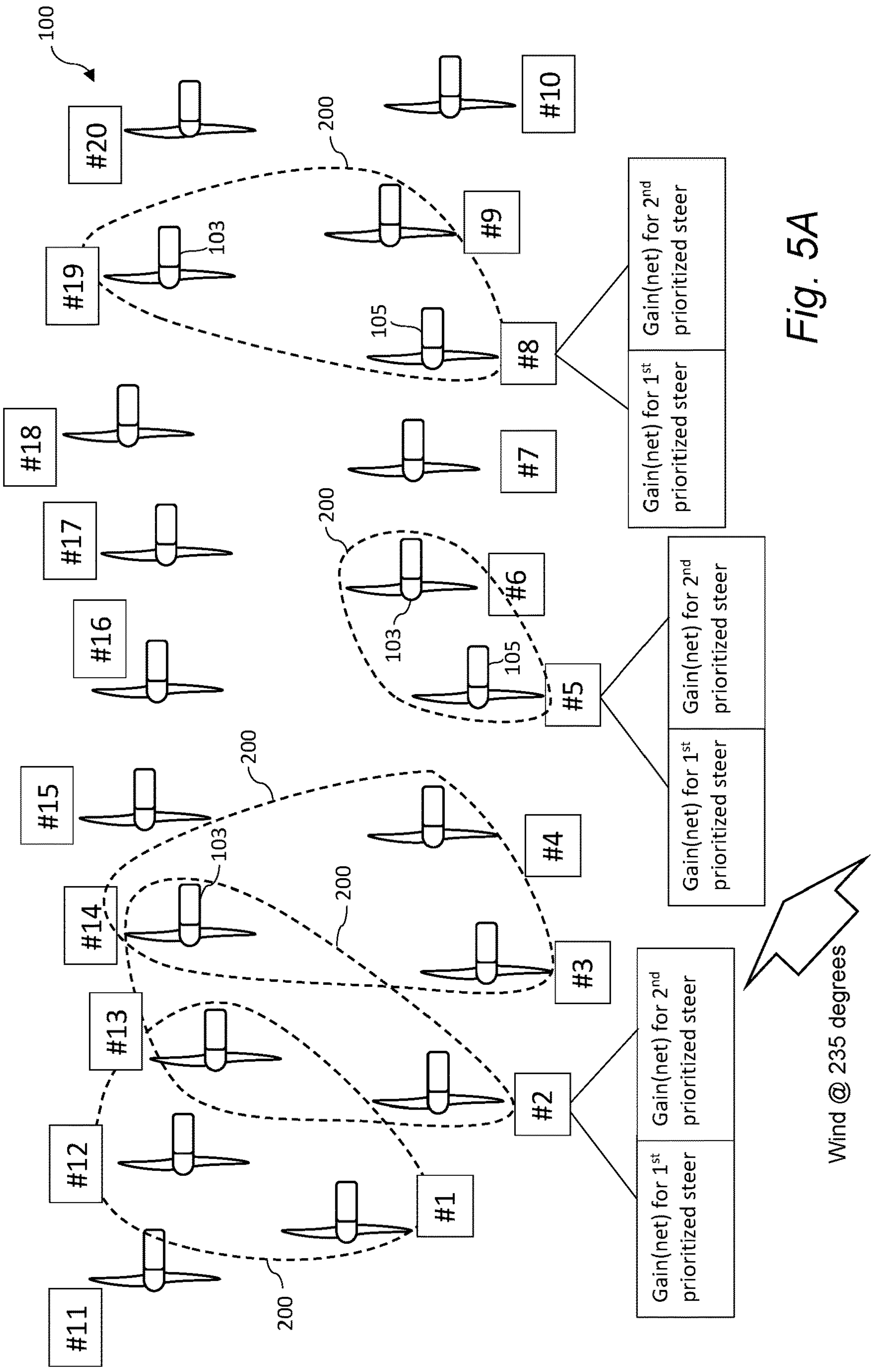
FIG. 5A illustrates diagram of a wind farm with the wind turbines assigned to particular clusters as a function of a different wind direction.

FIGS. 5A through 5C relate to an embodiment wherein the wind direction in the wind farm 100 has shifted to south-westerly (about 235 degrees). Based on this wind direction, one or more clusters 200 are identified by the controller(s), wherein each cluster 200 includes a “free” upwind wind turbine 105 that is impacted by wind unaffected by any other wind turbine. For example, in cluster #2, wind turbine #2 is the upwind wind turbine 105 and wind turbines #13 and #14 are the wake-effected downwind turbines 103 impacted by the wake from wind turbine #4 in the respective cluster 200. It should be appreciated that, as depicted in FIG. 5A, one or more of the wake-effected downwind turbines 103 may be impacted by the wake of multiple upwind wind turbines 105 and, thus, belong to multiple clusters. For example, wind turbine #13 is associated with the cluster #1 and the cluster #2.

Focusing on cluster #2 as an example, the method proposes to determine a yaw steer for upwind wind turbine #2 that increases (preferably, maximizes) a net energy (power) gain from cluster #2, wherein the net energy gain is computed by subtracting an energy cost of the yaw steer from an increased energy production of the cluster resulting from the yaw steer, as discussed above with respect to the embodiment of FIGS. 4A-4D.

FIG. 5B depicts a ranking of the clusters after the gains have been computed based on prioritized steers, as discussed above. At this point, the method may include implementing the yaw steers for the respective upwind turbines 105 of each cluster that satisfies the minimum threshold value.

FIG. 5C depicts the process of further refining the ranking of clusters prior to implementing the yaw steers. For example, clusters #1, #2, and #3 are non-disjoint clusters because they share at least one downwind turbine with another adjacent cluster. Cluster #2 is removed from the ranking because its gain (20 kW) is less that cluster #3 (30 kW), resulting in clusters #1 and #3 being disjointed. However, cluster #1 is also removed from the ranking because its gain (02 kW) is less than a threshold gain value established for the clusters. After removal of clusters #2 and #1, only disjoint clusters #3, #5, and #8 remain in the ranking.

Figure 6:
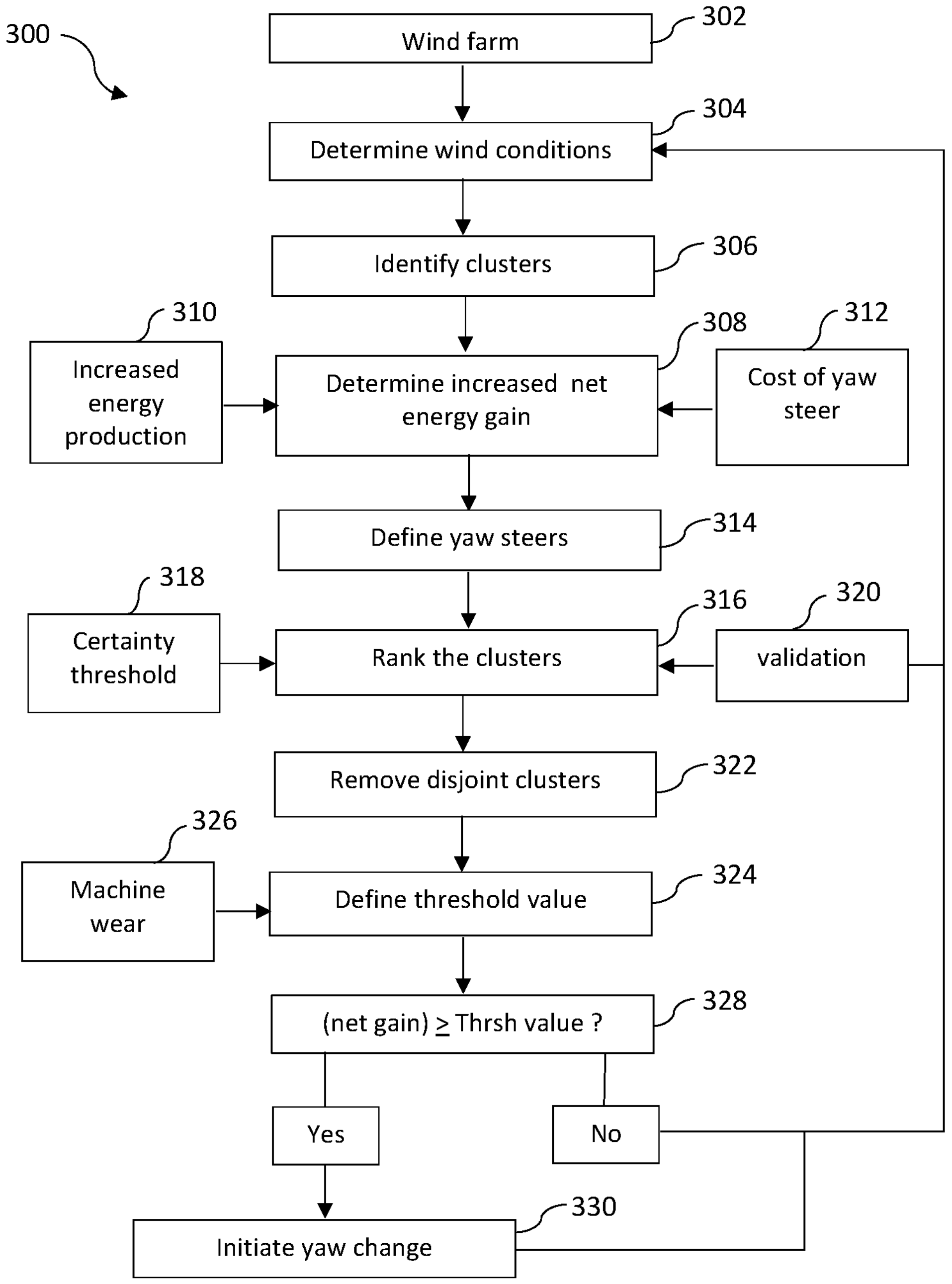
FIG. 6 is a flow chart of a method embodiment in accordance with aspects of the present disclosure.

FIG. 6 is a flowchart depicting various aspects of method embodiments 300 implemented with a wind farm 302 in accordance with the present disclosure.

At step 304, wind conditions (e.g., direction and speed) impacting the wind turbines in the wind farm are determined using conventional technology.

At step 306, based on the wind conditions, clusters of wind turbines within the wind farm are identified, wherein each cluster includes a “free” upstream wind turbine that is not affected by the wake of another turbine and at least one wake-effected downstream wind turbine.

At step 308, the increased net energy gain for each cluster is determined that includes consideration of the cost of the yaw steer (step 312) deducted from the increased energy gain of the cluster (step 310). This gain may be a maximized gain by determined by computing the net gain for a number of prioritized yaw steers for each cluster, as described above.

At step 314, yaw steers for one or more of the clusters are established based on the net energy gains.

At step 316, the clusters having yaw steers assigned thereto are ranked based on their respective net energy gains. This ranking may include consideration of a certainty threshold value (step 318) that considers the probability that the net energy gain will actually be realized from the yaw steer. As discussed, this certainty threshold value can be based on prediction models, past data, empirical determination, etc. A cluster that does not satisfy the certainty threshold value (or is close to the value) may be dropped or lowered in the ranking.

Step 320 depicts a validation process wherein, after the yaw steers are implemented, actual energy gain data for the respective clusters is used to adjust the certainty threshold values in a adaptive learning process.

At step 322, disjoint clusters may be removed from the ranking, as discussed above with respect to FIGS. 4A-4D and 5A-5C.

Step 324 depicts that a threshold gain value has been established as a prerequisite to implementing the yaw steers. Machine wear and life expectancy (step 326) may be factors considered in defining the threshold value.

Step 330 indicates that the threshold gain value is satisfied by the net gain prediction for the yaw steer, wherein the control transmits the yaw steer command and the yaw position of the upwind wind turbine in the cluster is changed according to the yaw steer command. The process proceeds in a continuous or periodic loop wherein changes in the wind conditions at step 304 triggers a repeat of the process.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for operating a wind farm having a plurality of wind turbines, the method comprising performing via a controller: determining a wind direction of a wind affecting the wind farm; based on the wind direction, identifying at least one upwind turbine that produces a wake effect on one or more downwind wind turbines, the upwind wind turbine and affected downwind wind turbines defining a cluster; based on a current yaw position of the upwind turbine and the wind direction, determining a yaw steer for the upwind turbine to reduce the wake effect on the downstream wind turbines in the cluster; wherein the yaw steer is based on increasing a net energy gain from the cluster, the net energy gain determined by subtracting an energy cost of the yaw steer from an increased energy production of the cluster resulting from the yaw steer; and controlling the upwind wind turbine to change yaw position in accordance with the yaw steer when the net energy gain satisfies a minimum threshold level.

Clause 2: The method according to clause 2, wherein one or more of the following are predetermined and stored for access by the controller: the identification of the cluster at a plurality of different wind directions; the energy cost for different yaw steers; and the increased energy production of the cluster for different yaw steers at a plurality of different wind directions.

Clause 3: The method according to clause 1 or 2, wherein the minimum threshold level is based at least in part on considerations of machinery wear and lifespan reduction caused by the yaw steers.

Clause 4: The method according to any one of clauses 1-3, wherein the increase in net energy gain is maximized by computing the net energy gain for a plurality of yaw steers for the cluster and selecting the yaw steer producing the highest net energy gain.

Clause 5: The method according to any one of clauses 1-4, further comprising identifying a plurality of the clusters, determining the yaw steer and net energy gain for each of the clusters, ranking the clusters according to the net energy gain of each of the clusters, and performing the yaw steers according to the ranking only for the clusters satisfying the minimum threshold level of the net energy gain.

Clause 6: The method according to any one of clauses 1-5, wherein the ranking of the clusters includes satisfying a certainty threshold for determination of the wake effect on the downwind wind turbines, wherein a cluster that does not satisfy the certainty threshold is not ranked and does not receive a yaw steer.

Clause 7: The method according to any one of clauses 1-6, wherein the ranking of the clusters is conducted according to one or more of: (a) a relative geographic position analysis of the upwind and downwind wind turbines in the clusters; (b) a physics based simulation model of the clusters; (c) a data driven analysis based on known energy production from the clusters at different wind conditions; (d) AI models applied to simulation data; and (e) a certainty priority consideration given to a cluster having a free stream upwind turbine directly affecting downwind wind turbines.

Clause 8: The method according to any one of clauses 1-7, wherein after ranking the clusters according to the net energy gain of the clusters, further comprising: determine non-disjoint clusters that share wind turbines with adjacent clusters; and remove non-disjoint clusters from the ranking that have a lesser net energy gain than adjacent non-disjoint clusters.

Clause 9: The method according to any one of clauses 1-8, wherein only disjoint clusters remain in the ranking after the removal of the non-disjoint clusters.

Clause 10: The method according to any one of clauses 1-9, wherein the identification of the plurality of clusters at a plurality of different wind directions is predetermined and stored for access by the controller.

Clause 11: A wind farm, comprising: a plurality of wind turbines; a controller, the controller configured to operate the wind farm by performing the following: determine a wind direction of a wind affecting the wind farm; based on the wind direction, identify at least one upwind turbine that produces a wake effect on one or more downwind wind turbines, the upwind wind turbine and affected downwind wind turbines defining a cluster; based on a current yaw position of the upwind turbine and the wind direction, determining a yaw steer for the upwind turbine to reduce the wake effect on the downstream wind turbines in the cluster; wherein the yaw steer is based on maximizing a net energy gain from the cluster, the net energy gain determined by subtracting an energy cost of the yaw steer from an increased energy production of the cluster resulting from the yaw steer; and controlling the upwind wind turbine to change yaw position in accordance with the yaw steer when the net energy gain satisfies a minimum threshold level.

Clause 12: The wind farm according to clause 11, wherein one or more of the following are predetermined and stored for access by the controller: the identification of the cluster at a plurality of different wind directions; the energy cost for different yaw steers; and the increased energy production of the cluster for different yaw steers at a plurality of different wind directions.

Clause 13: The wind farm according to clause 11 or 12, wherein the minimum threshold level is based at least in part on considerations of machinery wear and lifespan reduction caused by the yaw steers.

Clause 14: The wind farm according to any one of clauses 11-13, wherein the increase in net energy gain is maximized by computing the net energy gain for a plurality of yaw steers for the cluster and selecting the yaw steer producing the highest net energy gain.

Clause 15: The wind farm according to any one of clauses 11-14, wherein the controller is further configured to identify a plurality of the clusters, determine the yaw steer and net energy gain for each of the clusters, rank the clusters according to the net energy gain of each of the clusters, and initiate the yaw steers according to the ranking only for the clusters satisfying the minimum threshold level of the net energy gain.

Clause 16: The wind farm according to any one of clauses 11-15, wherein the ranking of the clusters by the controller includes satisfying a certainty threshold for determination of the wake effect on the downwind wind turbines, wherein a cluster that does not satisfy the certainty threshold is not ranked and does not receive a yaw steer.

Clause 17: The wind farm according to any one of clauses 11-16, wherein the ranking of the clusters is conducted by the controller according to one or more of: (a) a relative geographic position analysis of the upwind and downwind wind turbines in the clusters; (b) a physics based simulation model of the clusters; (c) a data driven analysis based on known energy production from the clusters at different wind conditions; (d) AI models applied to simulation data; and (e) a certainty priority consideration given to a cluster having a free stream upwind turbine directly affecting downwind wind turbines.

Clause 18: The wind farm according to any one of clauses 11-17, wherein after ranking the clusters according to the net energy gain of the clusters, the controller is further configured to: determine non-disjoint clusters that share wind turbines with adjacent clusters; and remove non-disjoint clusters from the ranking that have a lesser net energy gain than adjacent non-disjoint clusters.

Clause 19: The wind farm according to any one of clauses 11-18, wherein only disjoint clusters remain in the ranking after the removal of the non-disjoint clusters.

Clause 20: The wind farm according to any one of clauses 11-19, wherein the identification of the plurality of clusters at a plurality of different wind directions is predetermined and stored for access by the controller.

What is claimed is:

1. A method for operating a wind farm having a plurality of wind turbines, the method comprising performing via a controller:

determining a wind direction of a wind affecting the wind farm;

based on the wind direction, identifying at least one upwind turbine that produces a wake effect on one or more downwind wind turbines, the upwind wind turbine and affected downwind wind turbines defining a cluster;

based on a current yaw position of the upwind turbine and the wind direction, determining a yaw steer for the upwind turbine to reduce the wake effect on the downstream wind turbines in the cluster;

wherein the yaw steer is based on increasing a net energy gain from the cluster, the net energy gain determined by subtracting an energy cost of the yaw steer from an increased energy production of the cluster resulting from the yaw steer;

controlling the upwind wind turbine to change yaw position in accordance with the yaw steer when the net energy gain satisfies a minimum threshold level; and further comprising identifying a plurality of the clusters, determining the yaw steer and net energy gain for each of the clusters, ranking the clusters according to the net energy gain of each of the clusters, and performing the yaw steers according to the ranking only for the clusters satisfying the minimum threshold level of the net energy gain.

2. The method according to claim 1, wherein one or more of the following are predetermined for each of the clusters and stored for access by the controller: the identification of the cluster at a plurality of different wind directions; the energy cost for different yaw steers; or the increased energy production of the cluster for different yaw steers at a plurality of different wind directions.

3. The method according to claim 1, wherein the minimum threshold level is based at least in part on considerations of machinery wear and lifespan reduction caused by the yaw steers.

4. The method according to claim 1, wherein for each of the clusters the increase in net energy gain is maximized by computing the net energy gain for a plurality of yaw steers for the cluster and selecting the yaw steer producing the highest net energy gain.

5. The method according to claim 1, wherein the ranking of the clusters includes satisfying a certainty threshold for determination of the wake effect on the downwind wind turbines, wherein a cluster that does not satisfy the certainty threshold is not ranked and does not receive a yaw steer.

6. The method according to claim 1, wherein the ranking of the clusters is conducted according to one or more of: (a) a relative geographic position analysis of the upwind and downwind wind turbines in the clusters; (b) a physics based simulation model of the clusters; (c) a data driven analysis based on known energy production from the clusters at different wind conditions; (d) AI models applied to simulation data; or (e) a certainty priority consideration given to a cluster having a free stream upwind turbine directly affecting downwind wind turbines.

7. The method according to claim 1, wherein after ranking the clusters according to the net energy gain of the clusters, further comprising:

determine non-disjoint clusters that share wind turbines with adjacent clusters; and remove non-disjoint clusters from the ranking that have a lesser net energy gain than adjacent non-disjoint clusters.

8. The method according to claim 7, wherein only disjoint clusters remain in the ranking after the removal of the non-disjoint clusters.

9. The method according to claim 1, wherein the identification of the plurality of clusters at a plurality of different wind directions is predetermined and stored electronically in a memory for access by the controller.

10. A wind farm, comprising:

a plurality of wind turbines;

a controller, the controller configured to operate the wind farm by performing the following:

determine a wind direction of a wind affecting the wind farm;

based on the wind direction, identify at least one upwind turbine that produces a wake effect on one or more downwind wind turbines, the upwind wind turbine and affected downwind wind turbines defining a cluster;

based on a current yaw position of the upwind turbine and the wind direction, determining a yaw steer for the upwind turbine to reduce the wake effect on the downstream wind turbines in the cluster;

wherein the yaw steer is based on maximizing a net energy gain from the cluster, the net energy gain determined by subtracting an energy cost of the yaw steer from an increased energy production of the cluster resulting from the yaw steer;

controlling the upwind wind turbine to change yaw position in accordance with the yaw steer when the net energy gain satisfies a minimum threshold level; and wherein the controller is further configured to identify a plurality of the clusters, determine the yaw steer and net energy gain for each of the clusters, rank the clusters according to the net energy gain of each of the clusters, and initiate the yaw steers according to the ranking only for the clusters satisfying the minimum threshold level of the net energy gain.

11. The wind farm according to claim 10, wherein one or more of the following are predetermined and stored for access by the controller: the identification of the cluster at a plurality of different wind directions; the energy cost for different yaw steers; or the increased energy production of the cluster for different yaw steers at a plurality of different wind directions.

12. The wind farm according to claim 10, wherein the minimum threshold level is based at least in part on considerations of machinery wear and lifespan reduction caused by the yaw steers.

13. The wind farm according to claim 10, wherein for each of the clusters the increase in net energy gain is maximized by computing the net energy gain for a plurality of yaw steers for the cluster and selecting the yaw steer producing the highest net energy gain.

14. The wind farm according to claim 10, wherein the ranking of the clusters by the controller includes satisfying a certainty threshold for determination of the wake effect on the downwind wind turbines, wherein a cluster that does not satisfy the certainty threshold is not ranked and does not receive a yaw steer.

15. The wind farm according to claim 10, wherein the ranking of the clusters is conducted by the controller according to one or more of: (a) a relative geographic position analysis of the upwind and downwind wind turbines in the clusters; (b) a physics based simulation model of the clusters; (c) a data driven analysis based on known energy production from the clusters at different wind conditions; (d) AI models applied to simulation data; or (e) a certainty priority consideration given to a cluster having a free stream upwind turbine directly affecting downwind wind turbines.

16. The wind farm according to claim 10, wherein after ranking the clusters according to the net energy gain of the clusters, the controller is further configured to:

determine non-disjoint clusters that share wind turbines with adjacent clusters; and remove non-disjoint clusters from the ranking that have a lesser net energy gain than adjacent non-disjoint clusters.

17. The wind farm according to claim 16, wherein only disjoint clusters remain in the ranking after the removal of the non-disjoint clusters.

18. The wind farm according to claim 10, wherein the identification of the plurality of clusters at a plurality of different wind directions is predetermined and stored electronically in a memory for access by the controller.

* * * * *